(12) United States Patent
Kajiyama et al.

(10) Patent No.: US 8,546,018 B2
(45) Date of Patent: Oct. 1, 2013

(54) LI—NI-BASED COMPOSITE OXIDE PARTICLES FOR NON-AQUEOUS ELECTROLYTE SECONDARY BATTERY, PROCESS FOR PRODUCING THE SAME, AND NON-AQUEOUS ELECTROLYTE SECONDARY BATTERY

(75) Inventors: Akihisa Kajiyama, Yamaguchi-ken (JP);
Kazuhiko Kikuya, Fukuoka-ken (JP);
Teruaki Santoki, Fukuoka-ken (JP);
Osamu Sasaki, Fukuoka-ken (JP);
Satoshi Nakamura, Fukuoka-ken (JP);
Taiki Imahashi, Yamaguchi-ken (JP);
Hideaki Sadamura, Yamaguchi-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 396 days.

(21) Appl. No.: 12/742,125

(22) PCT Filed: Nov. 11, 2008

(86) PCT No.: PCT/JP2008/003259
§ 371 (c)(1),
(2), (4) Date: Aug. 20, 2010

(87) PCT Pub. No.: WO2009/063613
PCT Pub. Date: May 22, 2009

(65) Prior Publication Data
US 2010/0316910 A1    Dec. 16, 2010

(30) Foreign Application Priority Data

Nov. 12, 2007 (JP) ................................. 2007-293767

(51) Int. Cl.
*H01M 4/13* (2010.01)
(52) U.S. Cl.
USPC ....................... 429/223; 429/224; 429/231.95
(58) Field of Classification Search
None
See application file for complete search history.

(56) References Cited

U.S. PATENT DOCUMENTS

2003/0211391 A1 * 11/2003 Cho et al. .................. 429/218.1
2004/0180134 A1    9/2004 Kweon et al.

FOREIGN PATENT DOCUMENTS

JP    8-138670    5/1996
JP    2003-7299    1/2003

(Continued)

OTHER PUBLICATIONS

International Search Report for PCT/JP2008/003259, mailed Jan. 13, 2009.
Database WPI Week 200822 Thomson Scientific, London, GB; AN 2008-D08541; XP002669317, and JP 2007 213866 A (Nissan Motor Co Ltd) Aug. 23, 2007, abstract.
Park et al, "The Elevated Temperature Performance of LiMn2O4 Coated with LiNi1—XCoXO2 (X = 0.2 and 1)", Journal of Power Sources, Elsevier SA, CH, vol. 107, No. 1, Apr. 20, 2002, pp. 42-47, XP004347255.

(Continued)

*Primary Examiner* — Helen O Conley
(74) *Attorney, Agent, or Firm* — Nixon & Vanderhye P.C.

(57) ABSTRACT

The present invention relates to Li—Ni-based composite oxide particles comprising Mn, and Co and/or Al, wherein Co and Al are uniformly dispersed within the particles, and Mn is present with a gradient of its concentration in a radial direction of the respective particles such that a concentration of Mn on a surface of the respective particles is higher than that at a central portion thereof. The Li—Ni-based composite oxide particles can be produced by allowing an oxide and a hydroxide comprising Mn to mechanically adhere to Li—Ni-based oxide comprising Co and/or Al; and then heat-treating the obtained material at a temperature of not lower than 400° C. and not higher than 1,000° C. The Li—Ni-based composite oxide particles of the present invention are improved in thermal stability and alkalinity.

7 Claims, 1 Drawing Sheet

(56) References Cited

FOREIGN PATENT DOCUMENTS

| | | | |
|---|---|---|---|
| JP | 2003-331846 | | 11/2003 |
| KR | EP1556915 | * | 7/2005 |
| WO | 2006-123572 | | 11/2006 |

OTHER PUBLICATIONS

Extended European Search Report in EP 08 84 9214 dated Feb. 21, 2012.

* cited by examiner

LI—NI-BASED COMPOSITE OXIDE PARTICLES FOR NON-AQUEOUS ELECTROLYTE SECONDARY BATTERY, PROCESS FOR PRODUCING THE SAME, AND NON-AQUEOUS ELECTROLYTE SECONDARY BATTERY

This application is the U.S. national phase of International Application No. PCT/JP2008/003259, filed 11 Nov. 2008, which claims priority to Japanese Application No. 2007-293767, filed 12 Nov. 2007, the entire contents of each of which are hereby incorporated by reference.

TECHNICAL FIELD

The present invention relates to Li—Ni-based composite oxide particles for a non-aqueous electrolyte secondary battery which exhibit a large charge/discharge capacity and are excellent in thermal stability upon charging.

BACKGROUND ART

With the recent rapid development of portable and cordless electronic devices such as audio-visual (AV) devices and personal computers, there is an increasing demand for secondary batteries or batteries having a small size, a light weight and a high energy density as a power source for driving these electronic devices. Also, in consideration of global environments, electric cars and hybrid cars have been recently developed and put into practice, so that there is an increasing demand for lithium ion secondary batteries for large size applications having excellent storage characteristics. Under these circumstances, the lithium ion secondary batteries having advantages such as a large charge/discharge capacity and good storage characteristics have been noticed.

Hitherto, as positive electrode active substances useful for high energy-type lithium ion secondary batteries exhibiting a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary batteries using these active substances, lithium ion secondary batteries using $LiNiO_2$ have been noticed because of a large charge/discharge capacity thereof. However, this material tends to be deteriorated in thermal stability upon charging and charge/discharge cycle durability, and, therefore, it has been required to further improve properties thereof.

Specifically, when lithium is released from $LiNiO_2$, the crystal structure of $LiNiO_2$ suffers from Jahn-Teller distortion since $Ni^{3+}$ is converted into $Ni^{4+}$. When the amount of Li released reaches 0.45, the crystal structure of such a lithium-released region of $LiNiO_2$ is transformed from hexagonal system into monoclinic system, and a further release of lithium therefrom causes transformation of the crystal structure from monoclinic system into hexagonal system. Therefore, when the charge/discharge reaction is repeated, the crystal structure of $LiNiO_2$ tends to become unstable, so that the resulting secondary battery tends to be deteriorated in cycle characteristics or suffer from occurrence of undesired reaction between $LiNiO_2$ and an electrolyte solution owing to release of oxygen therefrom, resulting in deterioration in thermal stability and storage characteristics of the cell. To solve these problems, various studies have been made on materials to which Co and Al to are added by substituting a part of Ni in $LiNiO_2$ therewith. However, these materials have still failed to solve the above-described problems. Therefore, it has still been required to provide an Li—Ni-based composite oxide having a higher crystallinity.

Further, in the process for producing the Li—Ni-based composite oxide, in order to obtain the Li—Ni-based composite oxide having a high packing property and a stable crystal structure, it is required to use Ni composite hydroxide particles which are well controlled in properties, crystallinity and contents of impurities, and calcine the particles under the condition which is free from inclusion of $Ni^{2+}$ into Li sites thereof.

More specifically, it is required to provide Li—Ni-based composite oxide capable of exhibiting a high packing property, a stable crystal structure and an excellent thermal stability upon charging as a positive electrode active substance for a non-aqueous electrolyte secondary battery.

In order to improve the above thermal stability, it is important to suppress a reaction between oxygen released from the composite oxide and an electrolyte solution. Although the Li—Ni-based composite oxide produces $Ni^{4+}$ in a charged condition of the cell, the Ni ion in such an oxidized state is very unstable. As a result, oxygen tends to be readily released from the composite oxide, so that $Ni^{4+}$ tends to be reduced into $Ni^+$ or $Ni^{2+}$. For this reason, when using the composite oxide as a positive electrode active substance for the lithium secondary battery, problems concerning a thermal stability of the secondary battery such as generation of heat and firing tend to be caused in a charged condition of the cell.

In addition, it is considered that the problems concerning a thermal stability of the lithium secondary battery, in particular, generation of heat and firing, are caused at a solid-liquid boundary between the electrode active substance and the electrolyte solution as a starting point.

In view of these facts, in order to improve a thermal stability of the Li—Ni-based composite oxide, it is considered to be effective that the contact surface thereof with the electrolyte solution, i.e., the surface of the respective particles, is coated with other stable elements.

Hitherto, in order to improve various properties of LiNiO2 particles such as stabilization of a crystal structure and charge/discharge cycle characteristics, various improving methods have been attempted. For example, it is known that the surface of the respective Li—Ni-based oxide particles is coated with a compound such as lithium manganate (Patent Documents 1 to 5).

The safety of lithium ion cells becomes more and more important. For this reason, the studies on surface modification of active substance particles by noticing an interfacial reaction thereof during charging and discharging of the cells have been made as to various materials. For example, there are known many techniques using an Li—Co-based composite oxide as a core material (Japanese Patent Application Laid-Open (KOKAI) Nos. 2006-331939 and 2007-18743) or using an Li—Mn-based spinel oxide as a core material (Japanese Patent Application Laid-Open (KOKAI) No. 11-71114 (1999)). However, in any of these conventional techniques, from the viewpoint of a thermal stability, the core materials used therein are inherently stable. Therefore, the surface modification of the core particles mainly aims at preventing deterioration in cycle characteristics of the cells.

In the present invention, an Li—Ni-based composite oxide is used as the core material, and an object of the present invention is not to improve the cycle characteristics, but to solve the problems concerning a thermal stability peculiar to the Li—Ni-based composite oxide.

Patent Document 1: Japanese Patent Application Laid-open (KOKAI) No. 7-235292

Patent Document 2: Japanese Patent Application Laid-open (KOKAI) No. 9-265985

Patent Document 3: Japanese Patent Application Laid-open (KOKAI) No. 10-236826

Patent Document 4: Japanese Patent Application Laid-open (KOKAI) No. 11-67209

Patent Document 5: Japanese Patent Application Laid-open (KOKAI) No. 2007-213866

DISCLOSURE OF THE INVENTION

Problem to be Solved by the Invention

At present, it has been strongly required to provide the Li—Ni-based composite oxide particles as a positive electrode active substance for a non-aqueous electrolyte secondary battery which is improved in thermal stability upon charging. However, the Li—Ni-based composite oxide capable of fully satisfying the above requirement has not been obtained until now.

In the above Patent Document 1 (Japanese Patent Application Laid-Open (KOKAI) No. 7-235292), it is described that the surface of the respective lithium nickelate particles is coated with lithium cobaltate or lithium manganate. However, the resulting particles tend to fail to exhibit a sufficient thermal stability.

Also, in the above Patent Document 2 (Japanese Patent Application Laid-Open (KOKAI) No. 9-265985, $LiNiO_2$ is used as the core material. However, the present invention is different from the Patent Document 2 in that different kinds of metal elements are incorporated into the core material of the present invention to form a solid solution therewith for the purpose of enhancing properties of the core material itself.

In addition, in the above Patent Document 3 (Japanese Patent Application Laid-Open (KOKAI) No. 10-236826) and Patent Document 4 (Japanese Patent Application Laid-Open (KOKAI) No. 11-67209), the Li—Ni-based composite oxide is coated with the Li—Co-based composite oxide to improve an initial capacity and cycle properties of the resulting cell. However, the material of the coating layer used in these Patent Documents is constituted of the Li—Co-based composite oxide as a main component and, therefore, different from the material used in the present invention which is constituted of the Li—Ni-based composite oxide as a main component.

Further, in the above Patent Document 5 (Japanese Patent Application Laid-Open (KOKAI) No. 2007-213866), the Li—Ni-based composite oxide as a core material is coated with a different kind of material. However, the coating layer has an Li—Mn spinel crystal structure for the purpose of obtaining an active substance having a high output. On the other hand, in the present invention, for the purpose of enhancing mainly a thermal stability, the coating layer formed therein is different in crystal structure from that of the Patent Document 5, i.e., the coating layer of the present invention is not mainly constituted of the spinel layer.

Means for Solving the Problem

That is, according to the present invention, there are provided Li—Ni-based composite oxide particles comprising Mn, and Co and/or Al, Co and Al being present within the particles, Mn being present with a gradient of its concentration in a radial direction of the respective particles, and a concentration of Mn on a surface of the respective particles being higher than that at a central portion thereof (Invention 1).

Also, according to the present invention, there are provided Li—Ni-based composite oxide particles comprising secondary particles of Li—Ni-based oxide particles, Co and/or Al being present therewithin, Li—Mn-based composite oxide being present on a surface of the respective secondary particles, and a concentration of Mn being increased from a center toward a surface of the respective particles (Invention 2).

Also, according to the present invention, there are provided the Li—Ni-based composite oxide particles as described in the above Invention 2, wherein the secondary particles of the Li—Ni-based oxide particles as core particles have a composition represented by the formula:

$$Li_{x1}(Ni_{1-y1-z1-w1}Co_{y1}Mn_{z1}M1_{w1})O_2$$

(where x1, y1, z1 and w1 satisfy $0.9 \leq x1 \leq 1.3$, $0.1 \leq y1 \leq 0.3$, $0.0 \leq z1 \leq 0.3$ and $0 \leq w1 \leq 0.1$, respectively; and M1 is at least one metal selected from the group consisting of Al, Fe, Mg, Zr, Ti and B) (Invention 3).

Also, according to the present invention, there are provided the Li—Ni-based composite oxide particles as described in the above Invention 2 or 3, wherein the Li—Mn-based composite oxide has a composition represented by the formula:

$$Li_{z2}(Mn_{1-z2}M2_{z2})_{y2}O_2$$

(where M2 is at least one metal selected from the group consisting of Co, Ni, Al, Fe, Mg, Zr, Ti and B; and x2, y2 and z2 satisfy $1/2 < x2 \leq 4/3$, $2/3 \leq y2 \leq 1$ and $0 \leq z2 < 4/5$, respectively) (Invention 4).

Also, according to the present invention, there are provided the Li—Ni-based composite oxide particles as described in any one of the above Inventions 1 to 4, wherein a suspension prepared by suspending the Li—Ni-based composite oxide particles in distilled water has a pH value of not more than 11.5 as measured after allowing the suspension to stand at room temperature (Invention 5).

In addition, according to the present invention, there is provided a process for producing the Li—Ni-based composite oxide particles as described in any one of the above Inventions 1 to 5, comprising the steps of allowing an oxide and/or a hydroxide which comprise Mn to mechanically adhere to an Li—Ni-based oxide comprising Co and/or Al; and then heat-treating the obtained material at a temperature of not lower than 400° C. and not higher than 1,000° C. (Invention 6).

Also, according to the present invention, there is provided a process for producing the Li—Ni-based composite oxide particles as described in any one of the above Inventions 1 to 5, comprising the steps of allowing an oxide and/or a hydroxide which comprise Mn to mechanically adhere to an Ni-based hydroxide comprising Co and/or Al; mixing the obtained material with a lithium compound; and then heat-treating the obtained mixture at a temperature of not lower than 700° C. and not higher than 1,000° C. in an oxygen-containing atmosphere (Invention 7).

Also, according to the present invention, there is provided a process for producing the Li—Ni-based composite oxide particles as described in any one of the above Inventions 1 to 5, comprising the steps of dropping a manganese-containing solution and an alkali solution to a suspension of Ni-based hydroxide particles comprising Co and/or Al to produce a manganese-containing hydroxide, a manganese-containing oxide hydroxide or a manganese-containing oxide on a surface of a nickel oxide; subjecting the obtained material to washing with water and drying; mixing the dried material with a lithium compound; and then heat-treating the obtained mixture at a temperature of not lower than 700° C. and not higher than 1,000° C. in an oxygen-containing atmosphere (Invention 8).

Further, according to the present invention, there is provided a non-aqueous electrolyte secondary battery comprising the Li—Ni-based composite oxide particles as described in any one of the above Inventions 1 to 5, as a positive electrode active substance (Invention 9).

Also, according to the present invention, there is provided the non-aqueous electrolyte secondary battery as described in the above Invention 9, wherein when using a negative electrode comprising a material capable of absorbing and desorbing a metallic lithium or a lithium ion, an exothermic peak temperature as measured by differential thermal analysis at a positive electrode under the condition in which the cell is charged to 4.5 V is not lower than 240° C. (Invention 10).

Effect of the Invention

In the Li—Ni-based composite oxide particles according to the present invention, when a negative electrode formed from a material capable of absorbing and desorbing a metallic lithium or a lithium ion is used in a cell using the composite oxide particles, an exothermic maximum peak temperature of the cell as measured in the range of 200 to 290° C. by differential thermal analysis under the condition that the cell is charged to 4.5 V is shifted to a high-temperature side. As a result, it is possible to enhance a safety of the lithium ion cell.

In addition, the Li—Ni-based composite oxide particles according to the present invention can exhibit a high discharge capacity at a charge/discharge rate of 0.2 mA/cm$^2$ irrespective of a high thermal safety thereof.

Further, in the Li—Ni-based composite oxide particles according to the present invention, when an Li—Mn-based composite oxide is coated or allowed to be present on or in the vicinity of the surface of respective secondary particles of the Li—Ni-based oxide forming core particles by subjecting these materials to a wet chemical treatment or a dry mechanical treatment, or to further a thermal treatment in addition to the wet or dry treatment, it is possible to produce Li—Ni-based composite particles which can be enhanced in safety upon charging while keeping a high capacity.

Therefore, the Li—Ni-based composite oxide particles according to the present invention are suitable as a positive electrode active substance for a non-aqueous electrolyte secondary battery.

PREFERRED EMBODIMENT FOR CARRYING OUT THE INVENTION

The present invention is described in detail below.

First, the Li—Ni-based composite oxide particles for a non-aqueous electrolyte secondary battery according to the present invention are described.

In the Li—Ni-based composite oxide particles for a non-aqueous electrolyte secondary battery according to the present invention, an Li—Mn-based composite oxide is coated or allowed to be present on or in the vicinity of the surface of respective secondary particles of an Li—Ni-based composite oxide having a specific composition which form core particles. More specifically, the Li—Ni-based composite oxide particles according to the present invention are intended to involve not only those obtained by coating a whole surface of the secondary particles as the core particles with the Li—Mn-based composite oxide having a specific composition, but also those obtained by allowing the Li—Mn-based composite oxide having a specific composition to be present or adhere in the vicinity of the surface of the secondary particles as the core particles or onto a part of the surface thereof.

The Li—Ni-based oxide forming the core particles preferably has a composition represented by the formula:

$$Li_{x1}(Ni_{1-y1-z1-w1}Co_{y1}Mn_{z1}M1_{w1})O_2$$

(where x1, y1, z1 and w1 satisfy 0.9≤x1≤1.3, 0.1≤y1≤0.3, 0.0≤z1≤0.3 and 0≤w1≤0.1, respectively; and M1 is at least one metal selected from the group consisting of Al, Fe, Mg, Zr, Ti and B). When the composition of the Li—Ni-based oxide forming the core particles is out of the above-specified range, it may be difficult to attain a high discharge capacity as a feature of the Li—Ni-based oxide.

The particles which are coated or allowed to be present on the core particles have a composition represented by the formula:

$$Li_{x2}(Mn_{1-z2}M2_{z2})_{y2}O_2$$

(where M2 is at least one metal selected from the group consisting of Co, Ni, Al, Fe, Mg, Zr, Ti and B; x2, y2 and z2 satisfy 1/2<x2≤4/3, 2/3≤y2<1 and 0≤z2≤4/5, respectively. When the composition of the above particles is out of the above-specified range, the thermal stability upon charging may be deteriorated.

In the Li—Ni-based composite oxide particles according to the present invention, the concentration of Mn is increased from a center toward the surface of the respective particles. When the concentration of Mn is uniform over a whole part of the respective secondary particles, it may be difficult to achieve enhancement in a thermal stability thereof while keeping a high cell capacity of the secondary particles as core particles, as aimed by the present invention. In addition, when the concentration of Mn at a central portion of the respective particles is higher than that in a surface portion of the respective secondary particles, it may also be difficult to achieve enhancement in a thermal stability thereof while keeping a high cell capacity of the secondary particles as core particles, as aimed by the present invention.

The content of the Li—Mn composite oxide which is coated on the secondary particles of the Li—Ni-based oxide forming the core particles is preferably not less than 0.3% by weight and not more than 20% by weight based on the weight of the Li—Ni oxide. When the content of the Li—Mn composite oxide particles which are coated or allowed to be present on the core particles is less than 0.3% by weight, the resulting particles tend to be deteriorated in thermal stability under a charged condition of the cell although they maintain a high discharge capacity. When the content of the Li—Mn composite oxide particles which is coated or allowed to be present on the core particles is more than 20% by weight, the resulting particles tend to be deteriorated in discharge capacity although they are improved in thermal stability under a charged condition of the cell. The content of the Li—Mn composite oxide is more preferably 0.4 to 10% by weight and still more preferably 0.5 to 5% by weight.

The average secondary particle diameter of the secondary particles forming the core particles is preferably 3 to 20 μm. When the average secondary particle diameter is less than 3 μm, the resulting particles tend to exhibit a low electrode packing density and a large BET specific surface area, resulting in high reactivity with an electrolyte solution and, therefore, deteriorated thermal stability upon charging. When the average secondary particle diameter is more than 20 μm, the resulting cell tends to suffer from increase in resistance within an electrode owing to increase in thickness of the electrode and, therefore, deterioration in charge/discharge rate characteristics thereof. The average secondary particle diameter of the secondary particles forming the core particles is more preferably 5 to 20 μm.

The average primary particle diameter of the core particles is 0.5 to 1.5 μm. The core particles necessarily have such an average primary particle diameter at a temperature generally used for calcination of the particles.

The average primary particle diameter of the Li—Mn composite oxide which is coated or allowed to be present on the core particles is preferably 0.1 to 3.0 μm. The particles of the Li—Mn composite oxide necessarily have such an average primary particle diameter at a temperature generally used for calcination of the particles.

The average secondary particle diameter of the Li—Ni-based composite oxide particles for a non-aqueous electrolyte secondary battery according to the present invention is preferably 5 to 20 μm and more preferably 10 to 20 μm. When the average secondary particle diameter of the Li—Ni-based composite oxide particles is less than 5 μm, the Li—Ni-based composite oxide particles tend to suffer from not only decrease in electrode packing density, but also increase in reactivity with an electrolyte solution owing to increase in BET specific surface area thereof, resulting in deteriorated thermal stability upon charging. When the average secondary particle diameter of the Li—Ni-based composite oxide particles is more than 20 μm, the resulting cell tends to suffer from increase in resistance within an electrode owing to increase in thickness of the electrode and, therefore, deterioration in charge/discharge rate characteristics thereof.

The Li—Ni-based composite oxide particles according to the present invention preferably have a powder pH value of not more than 11.5. When the powder pH value of the Li—Ni-based composite oxide particles is more than 11.5, the resulting particles tends to be deteriorated in thermal stability, or a paint obtained using the particles tends to be undesirably gelled or undergo increase in a viscosity thereof upon forming it into a sheet. Meanwhile, the powder pH value of the Li—Ni-based composite oxide particles is determined from a pH value of a suspension as measured by suspending the Li—Ni-based composite oxide particles in distilled water and allowing the resulting suspension to stand at room temperature.

In the Li—Ni-based composite oxide particles for a non-aqueous electrolyte secondary battery according to the present invention, when using a negative electrode formed from a material capable of absorbing and desorbing a metallic lithium or a lithium ion, an exothermic maximum peak temperature thereof as measured in a differential thermal analysis at a positive electrode under the condition that the cell is charged to 4.5 V is preferably not lower than 240° C.

Next, the process for producing the Li—Ni-based composite oxide particles for a non-aqueous electrolyte secondary battery according to the present invention is described.

The Li—Ni-based composite oxide particles according to the present invention can be produced by any of (1) a process comprising the steps of allowing an oxide and/or a hydroxide which comprise Mn to mechanically adhere to an Li—Ni-based oxide comprising Co and/or Al; and then heat-treating the obtained material at a temperature of not lower than 400° C. and not higher than 1,000° C. (Invention 6), (2) a process comprising the steps of allowing an oxide and/or a hydroxide which comprise Mn to mechanically adhere to an Ni-based hydroxide comprising Co and/or Al; mixing the obtained material with a lithium compound; and then heat-treating the obtained mixture at a temperature of not lower than 700° C. and not higher than 1,000° C. in an oxygen-containing atmosphere (Invention 7), and (3) a process comprising the steps of dropping a manganese-containing solution and an alkali solution to a suspension of Ni-based hydroxide particles comprising Co and/or Al to produce a manganese-containing hydroxide, a manganese-containing oxide hydroxide or a manganese-containing oxide on a surface of an Ni-based hydroxide; subjecting the obtained material to washing with water and drying; mixing the dried material with a lithium compound; and then heat-treating the obtained mixture at a temperature of not lower than 700° C. and not higher than 1,000° C. in an oxygen-containing atmosphere (Invention 8).

First, the above production process (1) (Invention 6) is described. In the present invention, the Li—Ni-based oxide particles used as core particles may be produced by any ordinary method such as a solid phase method and a wet synthesis method. The Li—Ni-based oxide particles may also comprise different kinds of metals.

The content of Li in the Li—Ni-based oxide particles may be adjusted to be an excessive amount, for example, the content of Li is adjusted to be 0.9 to 1.3 times the amount of the other metals. When the content of Li mixed is too small, the resulting particles tend to be deteriorated in capacity. When the content of Li mixed is too large, the powder pH value of the resulting Li—Ni-based composite oxide particles tends to be undesirably high.

The thus obtained Li—Ni-based oxide particles are adhered with an oxide and/or a hydroxide of a metal element which forms a coating layer thereon. If required, elements other than Mn such as, for example, Al, Fe, Mg, Zr, Ti and B, may be added to the above particles. The adhering method may be conducted by using an apparatus capable of applying a shear force to a powder layer at a high speed. Examples of such an apparatus include a high-speed shearing mill, a blade-type kneader, a planetary mill, etc. Among these apparatuses, preferred is a high-speed shearing mill. Specific examples of the above high-speed shearing mill include "HYBRIDIZER" and "NOBILTA" manufactured by Hosokawa Micron Co., Ltd.

The Li—Ni-based oxide particles onto which the oxide and/or hydroxide of the metal element adhere are heat-treated at a temperature of 400 to 1,000° C. When the heat-treating temperature is lower than 400° C., the reaction tends to proceed insufficiently, so that the obtained Li—Ni-based composite oxide particles tend to be deteriorated in thermal stability. When the heat-treating temperature is higher than 1,000° C., the sintering between the particles tends to occur, and the powder pH value of the obtained Li—Ni-based composite oxide particles tends to become undesirably high. The heat-treating temperature is preferably 500 to 950° C.

The above heat treatment may be conducted either in an atmospheric air or in an oxygen gas flow.

Next, the above production process (2) (Invention 7) is described.

In the production process (2), the Ni-based hydroxide used as core particles may be produced by any ordinary method such as a solid phase method and a wet synthesis method. The Ni-based hydroxide may also comprise different kinds of metals.

The thus obtained Ni-based hydroxide particles are adhered with an oxide and/or a hydroxide of a metal element which forms a coating layer thereon. The adhering method may be conducted in the same manner as used in the above production process (1). If required, elements other than Mn such as, for example, Al, Fe, Mg, Zr, Ti and B may be added to the above particles.

The mixing ratio of the Li compound to the Ni-based hydroxide particles onto which the oxide and/or hydroxide of the metal element adhere is preferably 0.9 to 1.3. When the amount of Li mixed is too small, the resulting particles tend to be deteriorated in capacity. When the amount of Li mixed is too large, the powder pH value of the resulting Li—Ni-based composite oxide particles tends to become undesirably high.

The resulting mixture is then heat-treated at a temperature of 700 to 1,000° C. When the heat-treating temperature is lower than 700° C., the reaction tends to proceed insufficiently, so that the obtained Li—Ni-based composite oxide particles tend to be deteriorated in thermal stability. When the heat-treating temperature is higher than 1,000° C., the sintering between the particles tends to occur, and the powder pH value of the obtained Li—Ni-based composite oxide particles tends to become undesirably high. The heat-treating temperature is preferably 750 to 950° C.

The above heat treatment is preferably conducted in an oxygen-containing gas atmosphere.

Next, the above production process (3) (Invention 8) is described.

In the production process (3), the Ni-based hydroxide used as core particles may be produced by any ordinary method such as a solid phase method and a wet synthesis method. The Ni-based hydroxide may also comprise different kinds of metals.

The thus obtained Ni-based hydroxide particles are suspended in water, and a solution comprising a metal salt forming a coating layer is added to the resulting suspension. Then, the pH value of the suspension is adjusted to form any of a hydroxide, an oxide hydroxide or an oxide of the metal on the surface of the respective Ni-based hydroxide particles. If required, elements other than Mn such as, for example, Al, Fe, Mg, Zr, Ti and B may be added to the above particles.

The mixing ratio of the Li compound to the thus coated Ni-based hydroxide particles is preferably 1.00 to 1.08. When the amount of Li mixed is too small, the resulting particles tend to be deteriorated in capacity. When the amount of Li mixed is too large, the powder pH value of the resulting Li—Ni-based composite oxide particles tends to become undesirably high.

The resulting mixture is then heat-treated at a temperature of 700 to 1,000° C. When the heat-treating temperature is lower than 700° C., the reaction tends to proceed insufficiently, so that the obtained Li—Ni-based composite oxide particles tend to be deteriorated in thermal stability. When the heat-treating temperature is higher than 1,000° C., the sintering between the particles tends to occur, and the powder pH value of the obtained Li—Ni-based composite oxide particles tends to become undesirably high. The heat-treating temperature is preferably 750 to 950° C.

The above heat treatment is preferably conducted in an oxygen-containing gas atmosphere.

Next, the positive electrode using the positive electrode active substance comprising the Li—Ni-based composite oxide particles for a non-aqueous electrolyte secondary battery according to the present invention is described.

When producing the positive electrode using the Li—Ni-based composite oxide particles according to the present invention, a conducting agent and a binder are added to the Li—Ni-based composite oxide particles by an ordinary method. Examples of the preferred conducting agent include acetylene black, carbon black and graphite. Examples of the preferred binder include polytetrafluoroethylene and polyvinylidene fluoride.

The secondary battery produced by using the Li—Ni-based composite oxide particles according to the present invention comprises the above positive electrode, a negative electrode and an electrolyte.

Examples of a negative electrode active substance which may be used for production of the negative electrode include metallic lithium, lithium/aluminum alloys, lithium/tin alloys, graphite and black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate and lithium borate tetrafluoride in the above solvent.

The secondary battery produced by using the positive electrode active substance comprising the Li—Ni-based composite oxide particles according to the present invention has an initial discharge capacity of not less than 180 mAh/g. Further, the secondary battery exhibits such an excellent thermal stability that an exothermic maximum peak temperature thereof as measured by the below-mentioned method, i.e., as measured in a temperature range of 200 to 290° C. by a differential thermal analysis at a positive electrode under the condition that the cell is charged to 4.5 V when using metallic lithium as a negative electrode, is shifted by 15° C. or higher towards a high-temperature side. The temperature by which the exothermic maximum peak is shifted towards a high-temperature side is preferably 30° C. or higher and more preferably as high as possible.

<Function>

One of reasons for the lack of thermal stability of the non-aqueous electrolyte secondary battery is that the cell has a low oxygen desorption temperature. The desorption of oxygen in the cell tends to be caused due to desorption of oxygen from the surface of the electrode owing to unstable structure of the cell under a charged condition.

Thus, according to the present invention, an Li—Mn-based composite oxide having a specific composition is allowed to be present on or in the vicinity of the surface of an Li—Ni-based oxide whose secondary particles form core particles and have a specific composition, so that the concentration of Mn in the resulting Li—Ni-based composite oxide particles is increased from a center toward the surface of the respective particles. As a result, it is possible to improve an oxygen desorption temperature upon charging and enhance a thermal stability of the resulting cell upon charging.

Further, in the Li—Ni-based composite oxide particles according to the present invention, when a weight percentage of the Li—Mn-based composite oxide which is coated or allowed to be present on the surface of the respective secondary particles of the Li—Ni oxide forming the core particles is controlled to not less than 3% and not more than 20% based on the weight of the secondary particles, the resulting composite particles can be enhanced in thermal stability while keeping a high discharge capacity.

In addition, in the Li—Ni-based composite oxide particles according to the present invention, when the Li—Mn-based oxide is coated or allowed to be present on or in the vicinity of the surface of the respective secondary particles of the Li—Ni-based oxide forming the core particles by various methods, an exothermic maximum peak thereof as measured in a temperature range of 200 to 290° C. by a differential thermal analysis at a positive electrode under the condition that the cell is charged to 4.5 V, is shifted towards a higher-temperature side as compared to the case where the Li—Ni-based oxide forming the core particles was used solely, so that the resulting cell can be improved in safety upon charging.

EXAMPLES

Typical examples of the present invention are described in more detail below.

The average particle diameter of the particles is a volume-based average particle diameter as measured by a wet laser method using a laser type particle size distribution measuring apparatus "LMS-30" manufactured by Seishin Kigyo Co., Ltd.

The condition of existence of the particles which are coated or allowed to be present on the core particles was observed using a scanning electron microscope "SEM-EDX" equipped with an energy disperse type X-ray analyzer (manufactured by Hitachi High-Technologies Corp.).

The average primary particle diameter of the particles which are coated or present on the core particles was observed and determined using a scanning electron microscope "SEM-EDX" equipped with an energy disperse type X-ray analyzer (manufactured by Hitachi High-Technologies Corp.).

The powder pH value of the particles was determined from a pH value of a suspension thereof which was measured by suspending a predetermined amount of the particles in distilled water and then allowing the resulting suspension to stand at room temperature.

The coin cell (battery) produced by using the Li—Ni-based composite oxide particles was evaluated for initial charge/discharge characteristics and storage characteristics under a high temperature condition.

First, 90% by weight of the Li—Ni-based composite oxide particles as a positive electrode active substance, 3% by weight of acetylene black and 3% by weight of a graphite "KS-16" both serving as a conducting material, and 4% by weight of polyvinylidene fluoride dissolved in N-methyl pyrrolidone as a binder, were mixed with each other, and the resulting mixture was applied onto an Al metal foil and then dried at 150° C. The thus obtained sheets were blanked into 16 mm$\phi$ and then compression-bonded to each other under a pressure of 1 t/cm$^2$, thereby producing an electrode having a thickness of 50 μm and using the thus produced electrode as a positive electrode. A metallic lithium blanked into 16 mm$\phi$ was used as a negative electrode, and a solution prepared by mixing EC and DMC with each other at a volume ratio of 1:2 in which 1 mol/L of LiPF$_6$ was dissolved, was used as an electrolyte solution, thereby producing a coin cell of a CR2032 type.

The initial charge/discharge characteristics of the cell were determined as follows. That is, under a room temperature condition, the cell was charged at rate of 0.2 mA/cm$^2$ until reaching 4.25 V and then discharged at a rate of 0.2 mA/cm$^2$ until reaching 3.0 V to measure an initial charge capacity, an initial discharge capacity and an initial efficiency of the cell.

The evaluation for safety of the Li—Ni-based composite oxide particles was carried out as follows. That is, the coin cell of a CR2032 type was produced in the same manner as defined in the above evaluation for initial charge/discharge characteristics, and subjected to initial charge/discharge cycle. Then, the cell was subjected to the second charging at such a current as to complete charging of the cell up to 4.5 V for 10 hr. The coin cell was disassembled while being kept under the above charged condition to dismount the positive electrode therefrom. The positive electrode thus dismounted was received in a sealed state in an SUS pressure cell under the co-existence of the electrolyte solution, and then subjected to differential thermal analysis over the range of from room temperature to 400° C. at a scanning speed of 5° C./min.

Example 1

An aqueous solution prepared by mixing 2 mol/L of nickel sulfate with cobalt sulfate at a mixing molar ratio of Ni:Co of 84:16, and a 5.0 mol/L ammonia aqueous solution were simultaneously fed to a reaction vessel. The contents of the reaction vessel were always kept stirred by a blade-type stirrer and, at the same time, the reaction vessel was automatically supplied with a 2 mol/L sodium hydroxide aqueous solution so as to control the pH of the reaction mixture in the reaction vessel to 11.5±0.5. The Ni—Co hydroxide thus produced in the reaction vessel was overflowed therefrom through an overflow pipe, and collected in a concentration vessel connected to the overflow pipe to concentrate the Ni—Co hydroxide. The concentrated Ni—Co hydroxide was circulated to the reaction vessel, and the reaction was continuously carried out for 40 hr until the concentration of the Ni—Co hydroxide in the reaction vessel and a precipitation vessel reached 4 mol/L.

After completion of the reaction, the resulting suspension was withdrawn from the reaction vessel, and washed with water in an amount of 5 times the amount of the suspension using a filter press, and further subjected to deaggregation to adjust a concentration of the Ni—Co hydroxide in the suspension to 0.2 mol/L. A 0.2 mol/L sodium aluminate aqueous solution was continuously fed to the suspension in the reaction vessel such that a molar ratio of (Ni+Co):Al in the resulting mixture was 95:5. The contents of the reaction vessel were always kept stirred by the stirrer and, at the same time, a 0.2 mol/L sulfuric acid aqueous solution was automatically supplied thereto so as to control the pH of the reaction mixture of the reaction vessel to 10.5±0.5, thereby obtaining a suspension comprising the Ni—Co hydroxide coated with aluminum hydroxide.

The resulting suspension was washed with water in an amount of 10 times the weight of the Ni—Co hydroxide in the suspension using a filter press, and then dried, thereby obtaining the Ni—Co hydroxide particles coated with aluminum hydroxide which had a molar ratio of Ni:Co:Al=80:15:5 and an average secondary particle diameter of 14.5 μm. The resulting Al-coated Ni—Co hydroxide particles were mixed with lithium hydroxide monohydrate whose particle size was previously controlled by a crusher, such that a molar ratio of Li/(Ni+Co+Al) in the resulting mixture was 1.02.

The resulting mixture was calcined in an oxygen atmosphere at 750° C. for 10 hr, and then deaggregated and pulverized. As a result of ICP analysis, it was confirmed that the obtained calcined product had a chemical composition of $Li_{1.02}Ni_{0.8}Co_{0.15}Al_{0.05}O_2$ and an average particle diameter of 16 μm. The thus obtained Li—Ni-based oxide was used as secondary particles forming core particles.

Then, the thus obtained $Li_{1.02}Ni_{0.8}Co_{0.15}Al_{0.15}O_2$ forming the core particles was mixed with $Mn_3O_4$ such that the amount of $Mn_3O_4$ mixed was 2% by weight based on the weight of the core particles, and the resulting mixture was subjected to mechanical treatment using a mechanical crusher for 30 min, and then calcined again in an oxygen atmosphere at 800° C. for 5 hr, thereby obtaining Li—Ni-based composite oxide particles comprising secondary particles of $Li_{1.02}Ni_{0.8}Co_{0.15}Al_{0.05}O_2$ forming the core particles whose surface was coated with 2% by weight of $Li_2MnO_3$. At this time, it was confirmed that the average particle diameter ($D_{50}$) of the resulting composite oxide particles was 16 μm. As a result of subjecting the thus obtained Li—Ni-based composite oxide particles to X-ray diffraction analysis, it was confirmed that the Li—Ni-based oxide and $Li_2MnO_3$ were present therein, but no other different phases were observed.

Figure 1:
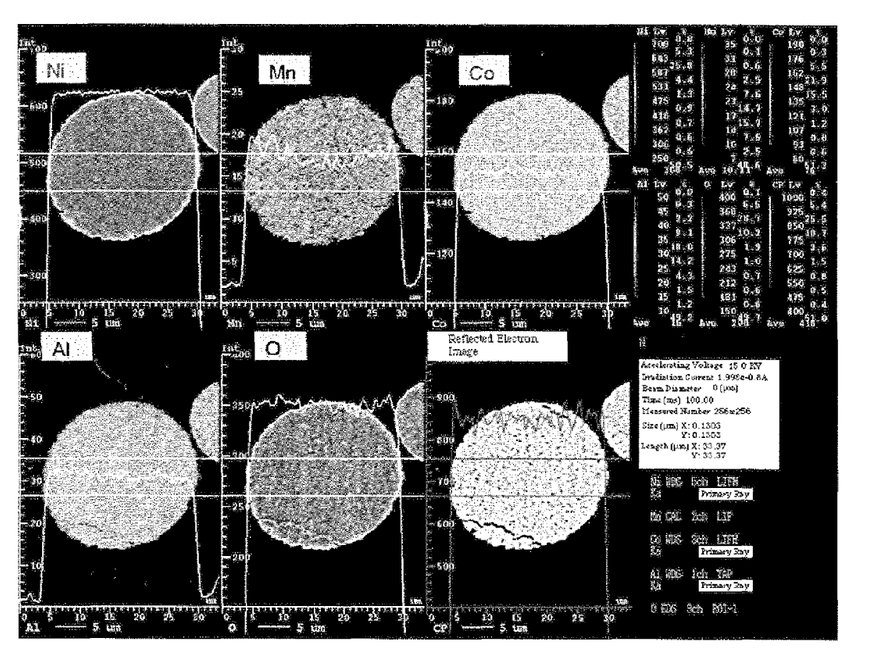
FIG. 1 is a photograph showing a compositional distribution of a section of the respective Li—Ni-based composite oxide particles obtained in Example 1.

The observation results of a compositional distribution of a section of the Li—Ni-based composite oxide particles obtained in Example 1 are shown in FIG. 1.

From FIG. 1, it was confirmed that in the Li—Ni-based composite oxide particles obtained in Example 1, the Li—Mn-based oxide was present on the surface of the respective secondary particles of the Li—Ni-based oxide forming the core particles. In addition, it was also confirmed that Mn in the respective composite oxide particles had a concentration gradient from a center toward the surface thereof, and the concentration of Mn was increased towards the surface of the respective particles. On the other hand, it was confirmed that in the respective composite particles, Co and Al had no concentration gradient, i.e., were present almost uniformly from the center to the surface of the respective particles.

The Li—Ni-based composite oxide particles were suspended in distilled water to prepare a 2 wt % suspension thereof, and the pH value of the resulting suspension was measured at room temperature. As a result, it was confirmed that the pH value of the suspension was 11.3. Further, as a result of subjecting a secondary battery produced using the Li—Ni-based composite oxide particles to differential thermal analysis at a positive electrode thereof under the condition that the cell was charged to 4.5 V, it was confirmed that an exothermic maximum peak temperature thereof (DSC) was 248° C. In addition, it was also confirmed that the discharge capacity (1-DCH) of the secondary battery using the Li—Ni-based composite oxide particles as a positive electrode active substance was 175 mAh/g.

Example 2

The Ni—Co hydroxide particles coated with aluminum hydroxide which had a compositional ratio of Ni:Co:Al of 80:15:5 and an average secondary particle diameter of 14.5 μm were produced in the same manner as defined in Example 1. The thus obtained hydroxide particles were mixed with $Mn_3O_4$ particles such that the amount of $Mn_3O_4$ mixed was 0.5% by weight based on the weight of the hydroxide particles, and the resulting mixture was subjected to mechanical treatment using a mechanical crusher for 30 min, thereby obtaining a composite material. The thus obtained composite material was mixed with lithium hydroxide monohydrate such that the molar ratio of Li/(Ni+Co+Al) was 1.02. The resulting mixture was then calcined in an oxygen atmosphere at 800° C. for 15 hr, thereby obtaining Li—Ni-based composite oxide particles comprising secondary particles of $Li_{1.02}Ni_{0.8}Co_{0.15}Al_{0.05}O_2$ whose surface was coated with 0.5% by weight of $Li_2MnO_3$.

The pH value of the thus obtained Li—Ni-based composite oxide particles as measured by the same method as defined in Example 1 was 11.4. In addition, as a result of conducting a differential thermal analysis under the condition that the cell was charged to 4.5 V, it was confirmed that an exothermic maximum peak temperature thereof was 250° C., and the discharge capacity of the Li—Ni-based composite oxide particles was 175 mAh/g.

Example 3

The Ni—Co hydroxide particles coated with aluminum hydroxide which had a compositional ratio of Ni:Co:Al of 80:15:5 and an average secondary particle diameter of 14.5 μm were produced in the same manner as defined in Example 1. The thus obtained hydroxide particles were suspended in pure water, and then manganese sulfate was dissolved in the resulting suspension such that the amount of manganese sulfate dissolved corresponded to 0.5% by weight in terms of $Mn_3O_4$ particles based on the weight of the hydroxide particles. The thus obtained suspension was titrated with 0.1N NaOH to precipitate a hydroxide of Mn on the surface of the Ni—Co—Al hydroxide. Successively, air was introduced into the suspension to oxidize the Mn hydroxide and allow the resulting oxidized product to adhere onto the surface of the respective Ni—Co—Al hydroxide particles. Next, the obtained suspension was washed with water in an amount of 10 times the weight of the Ni—Co hydroxide using a filter press, and then dried, thereby obtaining an Ni—Co—Al—Mn composite material. The thus obtained composite material was mixed with lithium hydroxide monohydrate such that the molar ratio of Li/(Ni+Co+Al) was 1.02. The resulting mixture was then calcined in an oxygen atmosphere at 800° C. for 15 hr, thereby obtaining Li—Ni-based composite oxide particles comprising secondary particles of $Li_{1.02}Ni_{0.8}Co_{0.15}Al_{0.05}O_2$ whose surface was coated with 0.5% by weight of $Li_2MnO_3$.

As a result of subjecting the thus obtained Li—Ni-based composite oxide particles to differential thermal analysis under the condition that the cell using the composite oxide particles was charged to 4.5 V, it was confirmed that an exothermic maximum peak temperature thereof was 246° C., and the discharge capacity of the Li—Ni-based composite oxide particles was 174 mAh/g. The pH value of the Li—Ni-based composite oxide particles as measured by the same method as defined in Example 1 was 11.4.

Example 4

The Ni—Co hydroxide particles coated with aluminum hydroxide which had a compositional ratio of Ni:Co:Al of 80:15:5 and an average secondary particle diameter of 14.5 μm were produced in the same manner as defined in Example 1. The thus obtained Al-coated Ni—Co hydroxide particles were mixed with lithium hydroxide monohydrate whose particle size was previously adjusted by a crusher such that the molar ratio of Li/(Ni+Co+Al) was 1.08.

The resulting mixture was then calcined in an oxygen atmosphere at 750° C. for 10 hr, and then deaggregated and pulverized. As a result of ICP analysis, it was confirmed that the obtained calcined product had a chemical composition of $Li_{1.02}Ni_{0.8}Co_{0.15}Al_{0.05}O_2$ and an average particle diameter of 20 μm. The thus obtained Li—Ni-based oxide was used as secondary particles forming core particles.

Then, the $Li_{1.02}Ni_{0.8}Co_{0.15}Al_{0.05}O_2$ forming the core particles was mixed with $Mn_3O_4$ such that the amount of $Mn_3O_4$ mixed was 5% by weight based on the weight of the core particles. The resulting mixture was subjected to mechanical treatment using a mechanical crusher for 30 min, and then calcined again in an oxygen atmosphere at 800° C. for 5 hr, thereby obtaining Li—Ni-based composite oxide particles comprising secondary particles of $Li_{1.02}Ni_{0.8}Co_{0.15}Al_{0.05}O_2$ forming the core particles whose surface was coated with $Li_2MnO_3$.

As a result of subjecting the thus obtained Li—Ni-based composite oxide particles to differential thermal analysis under the condition that the cell using the composite oxide particles was charged to 4.5 V, it was confirmed that an exothermic maximum peak temperature thereof was 250° C., and the discharge capacity of the Li—Ni-based composite oxide particles was 174 mAh/g. The pH value of the Li—Ni-based composite oxide particles as measured by the same method as defined in Example 1 was 11.4.

Example 5

The Ni—Co hydroxide particles coated with aluminum hydroxide which had a compositional ratio of Ni:Co:Al of 80:15:5 and an average secondary particle diameter of 14.5 μm were produced in the same manner as defined in Example 1. The thus obtained hydroxide particles were mixed with $Mn_3O_4$ particles such that the amount of $Mn_3O_4$ mixed was 5% by weight based on the weight of the hydroxide particles, and the resulting mixture was subjected to mechanical treatment using a mechanical crusher for 30 min, thereby obtaining a composite material. The thus obtained composite material was mixed with lithium hydroxide monohydrate such that the molar ratio of Li/(Ni+Co+Al) was 1.08. The resulting mixture was then calcined in an oxygen atmosphere at 900° C. for 15 hr, thereby obtaining Li—Ni-based composite oxide particles comprising secondary particles of $Li_{1.02}Ni_{0.8}Co_{0.15}Al_{0.05}O_2$ whose surface was coated with 5% by weight of $Li_2MnO_3$.

As a result of subjecting the thus obtained Li—Ni-based composite oxide particles to differential thermal analysis under the condition that the cell using the composite oxide particles was charged to 4.5 V, it was confirmed that an exothermic maximum peak temperature thereof was 252° C., and the discharge capacity of the Li—Ni-based composite oxide particles was 174 mAh/g. The pH value of the Li—Ni-based composite oxide particles as measured by the same method as defined in Example 1 was 11.4.

Example 6

The Ni—Co hydroxide particles coated with aluminum hydroxide which had a compositional ratio of Ni:Co:Al of 80:15:5 and an average secondary particle diameter of 14.5 μm were produced in the same manner as defined in Example 1. The thus obtained hydroxide particles were suspended in pure water, and then manganese sulfate was dissolved in the resulting suspension such that the amount of manganese sulfate dissolved corresponded to 5% by weight in terms of $Mn_3O_4$ particles based on the weight of the hydroxide particles. The thus obtained suspension was titrated with 0.1N NaOH to precipitate a hydroxide of Mn on the surface of the respective Ni—Co—Al hydroxide particles. Successively, air was introduced into the suspension to oxidize the Mn hydroxide and allow the resulting oxidized product to adhere onto the surface of the respective Ni—Co—Al hydroxide particles. Next, the obtained suspension was washed with water in an amount of 10 times the weight of the Ni—Co hydroxide using a filter press, and then dried, thereby obtaining an Ni—Co—Al—Mn composite material. The thus obtained composite material was mixed with lithium hydroxide monohydrate such that the molar ratio of Li/(Ni+Co+Al) was 1.08. The resulting mixture was then calcined in an oxygen atmosphere at 900° C. for 15 hr, thereby obtaining Li—Ni-based composite oxide particles comprising secondary particles of $Li_{1.08}Ni_{0.8}Co_{0.15}Al_{0.05}O_2$ whose surface was coated with 5% by weight of $Li_2MnO_3$.

As a result of subjecting the thus obtained Li—Ni-based composite oxide particles to differential thermal analysis under the condition that the cell using the composite oxide particles was charged to 4.5 V, it was confirmed that an exothermic maximum peak temperature thereof was 245° C., and the discharge capacity of the Li—Ni-based composite oxide particles was 174 mAh/g. The pH value of the Li—Ni-based composite oxide particles as measured by the same method as defined in Example 1 was 11.4.

Comparative Example 1

The Ni—Co—Mn hydroxide particles having a compositional ratio of Ni:Co:Mn of 50:20:30 and an average secondary particle diameter of 14.5 μm were mixed with lithium hydroxide monohydrate such that the molar ratio of Li/(Ni+Co+Mn) was 1.02. The resulting mixture was calcined in an oxygen atmosphere at 950° C. for 15 hr, there by obtaining a composite oxide having a chemical composition of $Li_{1.02}Ni_{0.5}Co_{0.2}Mn_{0.3}O_2$. Then, the thus obtained composite oxide was mixed with a composite hydroxide having a molar ratio of Co/Mn of 9/1 such that the amount of the hydroxide mixed was 3% by weight based on the weight of the composite oxide. The resulting mixture was subjected to mechanical treatment using a mechanical crusher for 30 min, and then calcined again in an oxygen atmosphere at 850° C. for 5 hr, thereby obtaining Li—Ni-based composite oxide particles comprising secondary particles of $Li_{1.02}Ni_{0.5}Co_{0.2}Mn_{0.3}O_2$ forming the core particles whose surface was coated with 3% by weight of $LiMn_{0.1}Co_{0.9}O_2$.

The thus obtained Li—Ni-based composite oxide particles were suspended in distilled water to prepare a 2 wt % suspension thereof, and the pH value of the resulting suspension was measured at room temperature. As a result, it was confirmed that the pH value of the suspension was 11.2. Further, as a result of subjecting the Li—Ni-based composite oxide particles to differential thermal analysis under the condition that the cell using the composite oxide particles was charged to 4.5 V, it was confirmed that an exothermic maximum peak temperature thereof was 232° C. In addition, it was also confirmed that the discharge capacity of the Li—Ni-based composite oxide particles was 175 mAh/g.

Comparative Example 2

The Ni—Co—Al composite hydroxide particles coated with aluminum hydroxide which had a compositional ratio of Ni:Co:Al of 80:15:5 and an average secondary particle diameter of 14.5 μm were produced in the same manner as defined in Example 1. The thus obtained composite hydroxide particles were mixed with lithium hydroxide monohydrate whose particle size was previously adjusted by a crusher such that the molar ratio of Li/(Ni+Co+Al) was 1.02.

The resulting mixture was calcined in an oxygen atmosphere at 750° C. for 10 hr, and then deaggregated and pulverized. As a result of ICP analysis, it was confirmed that the obtained calcined product had a chemical composition of $Li_{1.02}Ni_{0.8}Co_{0.15}Al_{0.05}O_2$ and an average particle diameter of 16 μm.

The thus obtained Li—Ni-based composite oxide particles were suspended in distilled water to prepare a 2 wt % suspension thereof, and the pH value of the resulting suspension was measured at room temperature. As a result, it was confirmed that the pH value of the suspension was 11.5. Further, as a result of subjecting the Li—Ni-based composite oxide particles to differential thermal analysis under the condition that the cell using the composite oxide particles was charged to 4.5 V, it was confirmed that an exothermic maximum peak temperature thereof was 236° C. In addition, it was also confirmed that the discharge capacity of the Li—Ni-based composite oxide particles was 175 mAh/g.

Comparative Example 3

The Ni—Co—Al composite hydroxide particles coated with aluminum hydroxide which had a compositional ratio of Ni:Co:Al of 80:15:5 and an average secondary particle diameter of 14.5 μm were produced in the same manner as defined in Example 1. The thus obtained composite hydroxide particles were mixed with lithium hydroxide monohydrate whose particle size was previously adjusted by a crusher such that the molar ratio of Li/(Ni+Co+Al) was 1.02.

The resulting mixture was calcined in an oxygen atmosphere at 750° C. for 10 hr, and then deaggregated and pulverized. As a result of ICP analysis, it was confirmed that the obtained calcined product had a chemical composition of $Li_{1.02}Ni_{0.80}Co_{0.15}Al_{0.05}O_2$ and an average particle diameter of 16 μm.

The thus obtained calcined product was mixed with $Li_2MnO_3$ particles such that the amount of the $Li_2MnO_3$ particles mixed was 0.5% by weight based on the weight of the calcined product. The resulting mixed particles were suspended in distilled water to prepare a 2 wt % suspension thereof, and the pH value of the resulting suspension was measured at room temperature. As a result, it was confirmed that the pH value of the suspension was 11.5. Further, as a result of subjecting the Li—Ni-based composite oxide particles to differential thermal analysis under the condition that the cell using the composite oxide particles was charged to 4.5 V, it was confirmed that an exothermic maximum peak temperature thereof was 236° C. In addition, it was also confirmed that the discharge capacity of the Li—Ni-based composite oxide particles was 173 mAh/g.

Comparative Example 4

The Ni—Co—Al composite hydroxide particles coated with aluminum hydroxide which had a compositional ratio of Ni:Co:Al of 80:15:5 and an average secondary particle diameter of 14.5 μm were produced in the same manner as defined in Example 1. The thus obtained composite hydroxide particles were mixed with lithium hydroxide monohydrate whose particle size was previously adjusted by a crusher such that the molar ratio of Li/(Ni+Co+Al) was 1.02.

The resulting mixture was calcined in an oxygen atmosphere at 750° C. for 10 hr, and then deaggregated and pulverized. As a result of ICP analysis, it was confirmed that the obtained calcined product had a chemical composition of $Li_{1.02}Ni_{0.80}Co_{0.15}Al_{0.05}O_2$ and an average particle diameter of 16 μm. Then, the calcined product was mixed with a composite hydroxide having a molar ratio of Ni/Mn of 9/1 such that the amount of the composite hydroxide mixed was 3% by weight based on the weight of the calcined product. The resulting mixture was subjected to mechanical treatment using a mechanical crusher for 30 min, and then calcined again in an oxygen atmosphere at 850° C. for 5 hr, thereby obtaining Li—Ni-based composite oxide particles comprising secondary particles of $Li_{1.02}Ni_{0.5}Co_{0.2}Al_{0.3}O_2$ forming the core particles whose surface was coated with 3% by weight of $LiMn_{0.1}Co_{0.9}O_2$.

The resulting mixed particles were suspended in distilled water to prepare a 2 wt % suspension thereof, and the pH value of the resulting suspension was measured at room temperature. As a result, it was confirmed that the pH value of the suspension was 11.2. Further, as a result of subjecting the Li—Ni-based composite oxide particles to differential thermal analysis under the condition that the cell using the composite oxide particles was charged to 4.5 V, it was confirmed that an exothermic maximum peak temperature thereof was 230° C. In addition, it was also confirmed that the discharge capacity of the Li—Ni-based composite oxide particles was 175 mAh/g.

Thus, the Li—Ni-based composite oxide particles were produced by variously changing the composition of the core particles for the Li—Ni-based composite oxide particles, the composition and weight percentage of the particles which were coated or allowed to be present on or in the vicinity of the surface of the respective core particles, and the calcination temperature. Various properties of the thus obtained Li—Ni-based composite oxide particles are shown in Table 1.

TABLE 1

| Examples and Comp. Examples | Core: $Li_{x1}(Ni_{1-y1-z1-w1}Co_{y1}Mn_{z1}M1_{w1})O_2$ | | | | | |
|---|---|---|---|---|---|---|
| | Lix1 | Ni1 − y1 − z1 − w1 | Coy1 | Mnz1 | M1 (Al, Fe, Mg, Zr, Ti, B) | w1 |
| Example 1 | 1.02 | 0.8 | 0.15 | — | Al | 0.05 |
| Example 2 | — | 0.8 | 0.15 | — | Al | 0.05 |
| Example 3 | — | 0.8 | 0.15 | — | Al | 0.05 |
| Example 4 | 1.08 | 0.8 | 0.15 | — | Al | 0.05 |
| Example 5 | — | 0.8 | 0.15 | — | Al | 0.05 |
| Example 6 | — | 0.8 | 0.15 | — | Al | 0.05 |
| Comp. Example 1 | — | 0.5 | 0.2 | 0.3 | — | 0 |
| Comp. Example 2 | 1.02 | 0.8 | 0.15 | — | Al | 0.05 |
| Comp. Example 3 | 1.02 | 0.8 | 0.15 | — | Al | 0.05 |
| Comp. Example 4 | 1.02 | 0.8 | 0.15 | — | Al | 0.05 |

| Examples and Comp. Examples | Shell: $Li_{x2}(Mn_{1-z2}M2_{z2})_{y2}O_2$ | | | | | Coating (wt %) | Sintering temp. (° C.) |
|---|---|---|---|---|---|---|---|
| | LiX2 | y2 | Mn1 − z2 | M2 (Co, Ni, Al, Fe, Mg, Zr, Ti, B) | z2 | | |
| Example 1 | 4/3 | 2/3 | 1 | — | 0 | 2 | 800 |
| Example 2 | 4/3 | 2/3 | 1 | — | 0 | 0.5 | 800 |
| Example 3 | 4/3 | 2/3 | 1 | — | 0 | 0.5 | 800 |
| Example 4 | 4/3 | 2/3 | 1 | — | 0 | 5 | 900 |
| Example 5 | 4/3 | 2/3 | 1 | — | 0 | 5 | 900 |
| Example 6 | 4/3 | 2/3 | 1 | — | 0 | 5 | 900 |
| Comp. Example 1 | 1 | 1 | 0.1 | Co | 0.9 | 3 | 850 |
| Comp. Example 2 | — | — | — | — | — | — | — |
| Comp. Example 3 | 4/3 | 2/3 | 1 | — | 0 | 0.5 | 800 |
| Comp. Example 4 | 1 | 1 | 0.1 | Ni | 0.9 | 5 | 850 |

| Examples and Comp. Examples | Properties of Li—Ni-based composite oxide | | | |
|---|---|---|---|---|
| | Average secondary particle diameter $D_{50}$ (μM) | pH | DSC | 1-DCH |
| Example 1 | 16 | 11.3 | 248 | 175 |
| Example 2 | 15 | 11.4 | 250 | 175 |
| Example 3 | 17 | 11.4 | 246 | 174 |
| Example 4 | 20 | 11.4 | 250 | 174 |
| Example 5 | 20 | 11.4 | 252 | 174 |
| Example 6 | 20 | 11.4 | 251 | 174 |
| Comp. Example 1 | 15 | 11.2 | 232 | 175 |
| Comp. Example 2 | — | 11.5 | 236 | 174 |
| Comp. Example 3 | 15 | 11.5 | 236 | 173 |
| Comp. Example 4 | 15 | 11.2 | 230 | 175 |

The Li—Ni-based composite oxide particles obtained in Examples 1 to 6 all exhibited an exothermic maximum peak higher than that of the core particles (i.e., shifted to a higher-temperature side). As a result, it is recognized that the Li—Ni-based composite oxide particles according to the present invention are inhibited from undergoing the reaction with an electrolyte solution upon charging, and, therefore, can provide a positive electrode material having an excellent thermal stability.

In addition, the Li—Ni-based composite oxide particles obtained in Examples 1 to 6 all exhibited an initial discharge capacity of not less than 170 mAh/g, and, therefore, can provide a positive electrode material having a high discharge capacity.

From the results described above, it was confirmed that the Li—Ni-based composite oxide particles according to the present invention exhibit a large charge/discharge capacity and are, therefore, effective as an active substance for a non-aqueous electrolyte cell which has an excellent thermal stability upon charging.

INDUSTRIAL APPLICABILITY

When using the Li—Ni-based composite oxide particles for a non-aqueous electrolyte secondary battery according to the present invention, it is possible to obtain a non-aqueous electrolyte cell having a large charge/discharge capacity and an excellent thermal stability upon charging.

The invention claimed is:

1. Li—Ni-based composite oxide particles comprising secondary particles of Li—Ni-based oxide particles having a Li—Mn-based composite oxide being present on a surface of the respective secondary particle with a composition represented by the formula:

$$Li_{x2}(Mn_{1-z2}M2_{z2})_{y2}O_2$$

where M2 is at least one metal selected from the group consisting of Co, Ni, Al, Fe, Mg, Zr, Ti and B; and x2, y2 and z2 satisfy $1/2<x2\leq4/3$, $2/3\leq y2\leq1$ and $0\leq z2<4/5$, respectively, Co and/or Al being present therewithin, and a concentration of Mn being increased from a center toward a surface of the respective particles.

2. Li—Ni-based composite oxide particles according to claim 1, wherein the secondary particles of the Li—Ni-based oxide particles as core particles have a composition represented by the formula:

$$Li_{x1}(Ni_{1-y1-z1-w1}Co_{y1}Mn_{z1}M1_{w1})O_2$$

(where x1, y1, z1 and w1 satisfy $0.9\leq x1\leq1.3$, $0.1\leq y1\leq0.3$, $0.0\leq z1\leq0.3$ and $0\leq w1\leq0.1$, respectively; and M1 is at least one metal selected from the group consisting of Al, Fe, Mg, Zr, Ti and B).

3. The Li—Ni-based composite oxide particles of claim 1, wherein $x2=4/3$ and $y2=2/3$.

4. The Li—Ni-based composite oxide particles of claim 1, wherein when using a negative electrode comprising a material capable of absorbing and desorbing a metallic lithium or a lithium ion, an exothermic peak temperature as measured by differential thermal analysis at a positive electrode under the condition that the cell is charged to 4.5 V is not lower than 240° C.

5. The Li—Ni-based composite oxide particles of claim 1, wherein the average primary particle diameter of the Li—Mn composite oxide which is coated or allowed to be present on the core particles is 0.1 to 3.0 μm.

6. The Li—Ni-based composite oxide particles of claim 1, wherein the content of the Li—Mn composite oxide which is coated on the secondary particles of the Li—Ni-based oxide forming the core particles is not less than 0.3% by weight and not more than 20% by weight based on the weight of the Li—Ni oxide.

7. The Li—Ni-based composite oxide particles of claim 1, wherein the average secondary particle diameter of the secondary particles forming the core particles is 5 to 20 μm.

* * * * *